United States Patent [19]
Madter et al.

[11] Patent Number: 5,450,574
[45] Date of Patent: Sep. 12, 1995

[54] APPARATUS AND METHOD FOR ENHANCING THE PERFORMANCE OF PERSONAL COMPUTERS

[75] Inventors: Richard C. Madter, Puslinch; Mohammed M. Turki, Toronto, both of Canada

[73] Assignee: All Computers Inc., Toronto, Canada

[21] Appl. No.: 37,875

[22] Filed: Mar. 29, 1993

[51] Int. Cl.⁶ ............................................. G06F 1/04
[52] U.S. Cl. ................................................. 395/550
[58] Field of Search ....................................... 395/550

[56] References Cited

U.S. PATENT DOCUMENTS

| | | |
|---|---|---|
| 4,545,030 | 10/1985 | Kitchin . |
| 4,819,164 | 4/1989 | Branson . |
| 4,845,437 | 7/1989 | Mansur et al. . |
| 4,847,516 | 7/1989 | Fujita et al. .......................... 307/269 |
| 4,855,616 | 8/1989 | Wang et al. . |
| 5,059,818 | 10/1991 | Witt et al. . |
| 5,115,503 | 5/1992 | Durkin . |
| 5,261,082 | 11/1993 | Ito et al. .............................. 395/550 |
| 5,309,561 | 5/1994 | Overhouse et al. ............... 395/550 X |

Primary Examiner—Thomas M. Heckler
Attorney, Agent, or Firm—Kenneth M. Garrett

[57] ABSTRACT

An accelerator board for use in replacing the microprocessor of a computer system board having a system clock. The accelerator board includes a high frequency oscillator which may be stopped and started under the influence of a clock enable signal. The clock enable signal is synchronized with the phase and logic state of the system clock, to form a clock select signal which serves to toggle a clock selector. When a system access is requested, clock enable stops the high frequency oscillator in a specific phase and logic state, and also toggles the clock selector to select the system clock as the clock speed for all accelerator board operations, giving a smooth transfer. When system access is no longer requested, the high frequency oscillator is restarted and is selected by the clock selector for all accelerator board operations. No time delay is encountered in switching from low to high speeds.

14 Claims, 6 Drawing Sheets

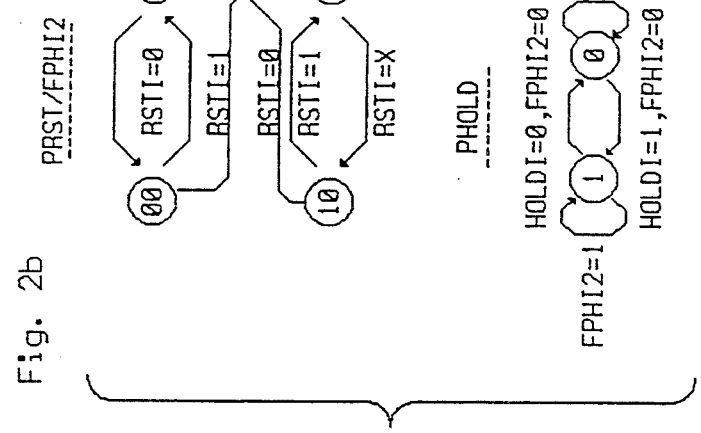
Fig. 2b PRST/FPHI2
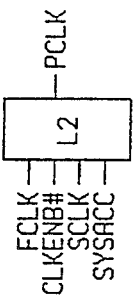
Fig. 4a Clock Selector
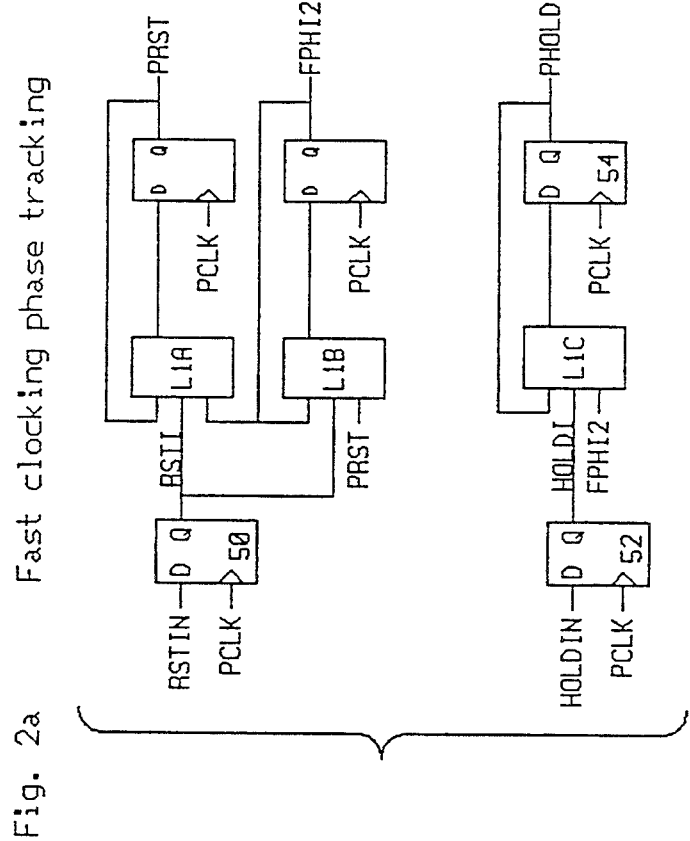
Fig. 2a Fast clocking phase tracking
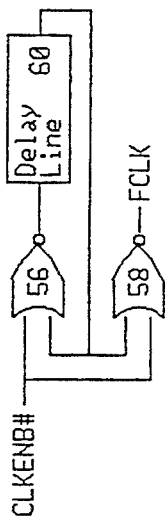
Fig. 3a High Frequency Oscillator

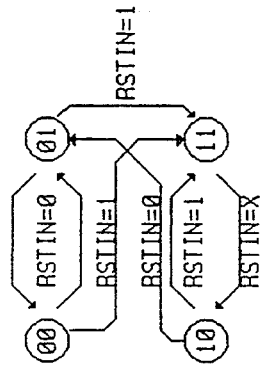
Fig. 5b  RST/SPHI2
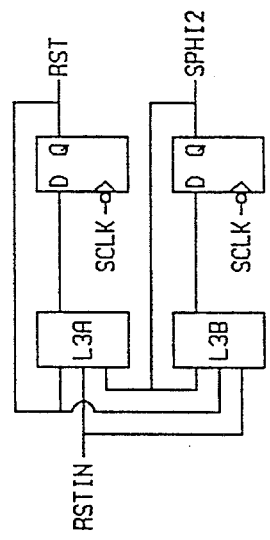
Fig. 5a  Slow clock phase tracking
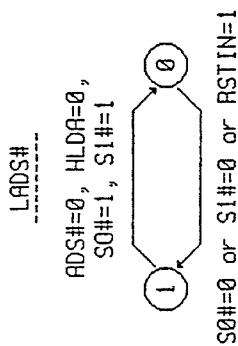
Fig. 6b  CLKENB#
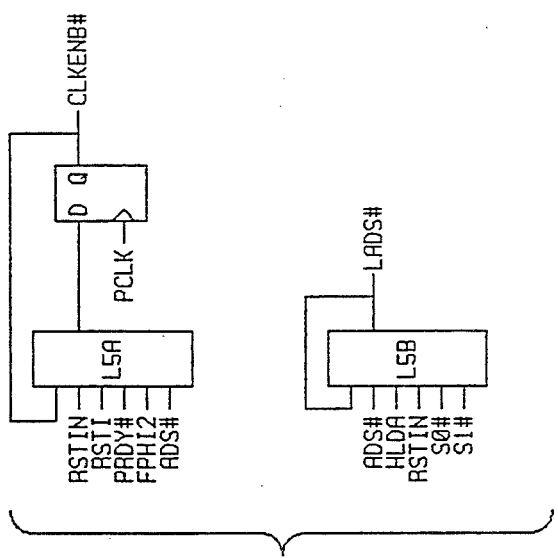
Fig. 6a  System access detector

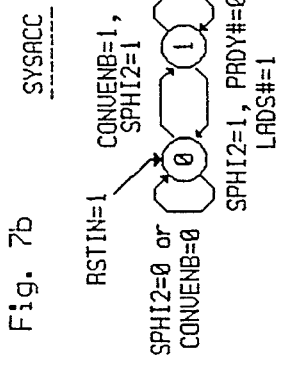
Fig. 7b
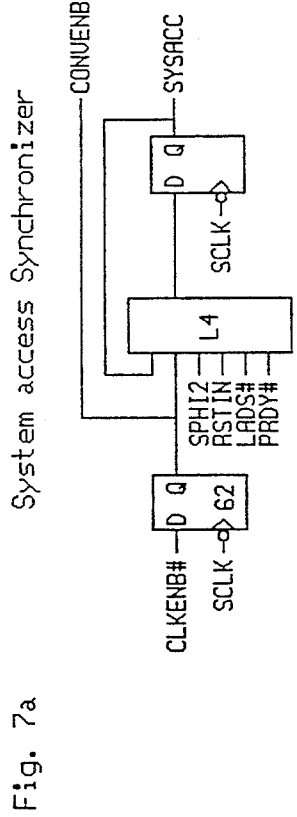
Fig. 7a
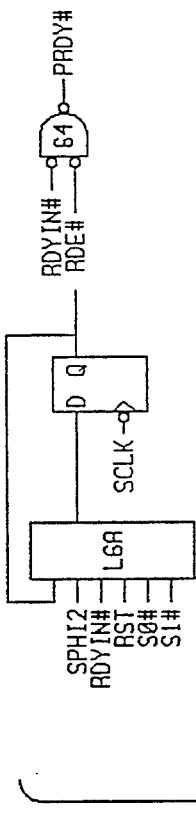
Fig. 8a
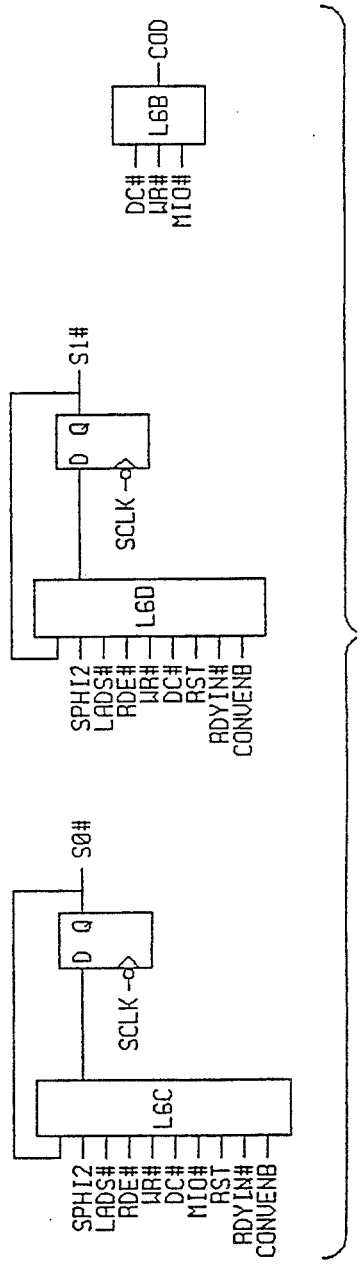

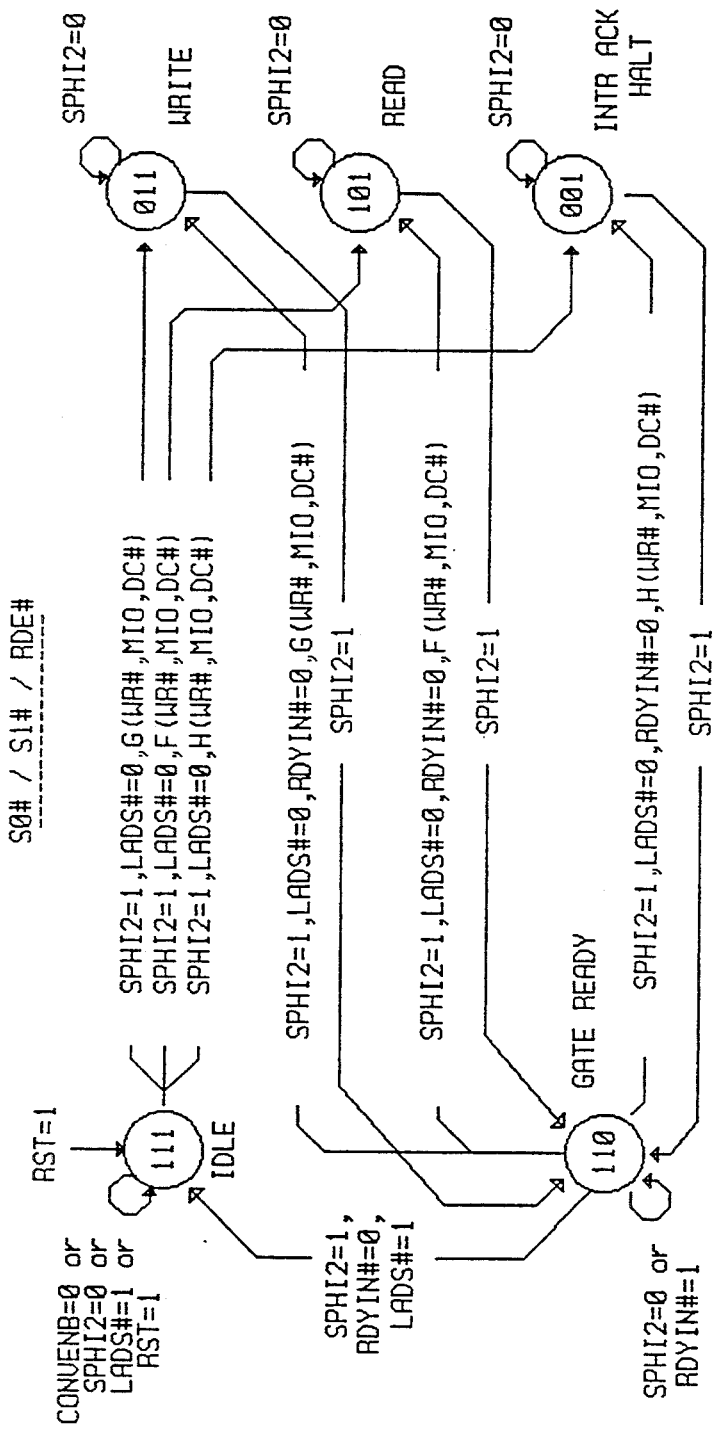
Fig. 8b
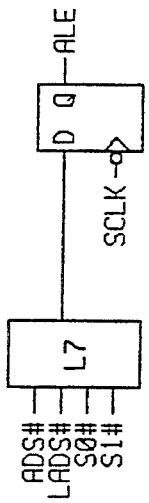
Fig. 9a Address Latch Control

APPARATUS AND METHOD FOR ENHANCING THE PERFORMANCE OF PERSONAL COMPUTERS

FIELD OF INVENTION

This invention relates to devices that may be used to replace a microprocessor of a personal computer system to enhance the performance of the system.

BACKGROUND OF INVENTION

One way to increase the performance of a personal computer system is to replace the microprocessor in the system with a higher speed microprocessor having local high speed devices for example cache memory or RAM memory that can be accessed by the microprocessor. Peripheral circuits such as direct memory access (DMA), floppy and hard disk controllers, video display and interrupt controllers, real time clock, timers and read only memory (ROM) of the computer system may be accessed at the original rate using the original microprocessor clock. Although replacing all of the peripheral circuits in the computer system with circuits which can operate at the new higher speed would yield maximum performance, the cost would be high and many of the higher speed circuits would have only small performance increases. Therefore it is most cost effective to replace only those pans of the computer system which give the highest increase in performance for the cost.

Some previous performance increasing solutions have used a higher speed microprocessor with cache or local RAM memory operating from a local high frequency free-running oscillator. To perform data transfers with the original computer system, the signals going to the system are first synchronized to the original microprocessor clock and then the returning signals are synchronized to the new higher frequency microprocessor clock. However, this double synchronization process for each access to the slower peripheral circuits can impose a severe performance penalty. Providing the ratio of new to original microprocessor clock rate combined with the hit ratio of the high speed local memory is sufficient, the performance will increase, but the increase would be greater if some of the synchronizing delays can be eliminated. In cases where the clock ratio is small and/or the local memory hit ratio is small, a reduction in performance compared to the original computer system can be expected due to the synchronizing delays.

OBJECTS OF THE INVENTION

It is an object of this invention to provide apparatus and method whereby a microprocessor may be operated at different clock speeds in accordance with a request.

It is another object of this invention to provide such apparatus and method wherein the clock speeds may be selected with a minimum delay.

It is yet another object of this invention to provide apparatus and method for substituting the microprocessor of a personal computer to provide enhanced computing power.

SUMMARY OF INVENTION

In accordance with one aspect of this invention, a computer system includes a microprocessor, first and second groups of components for operation under the control of the microprocessor respectively at first and second clock speeds; a first clock for generating clock signals at the first speed; a second clock independent of the first clock for generating clock signals at the second speed, means for starting and stopping the second clock such that the second clock is stopped in a known, predetermined phase and started with the second clock signals in desired phase relationship with those of the first clock, and means for selecting the second clock signal to control the operation of the microprocessor when the second clock is operating and the first clock signal when the second clock is stopped.

It will be understood that the starting and stopping and selecting means will be responsive to a request initiated in the system to transmit data between the microprocessor and either the first or second groups of components.

The switching between the clock speeds may be effected without undue delay, and the desired clock speed will remain in effect for so long as the request remains in force or for so long as it is negated.

In accordance with another aspect of the invention, an accelerator board is provided which may be substituted for the microprocessor of a personal computer; throughout the description of the invention, a microprocessor substituted in this manner may be referred to as a "ghost" microprocessor. The personal computer system will normally include a first clock which will normally be continuously operable for generating a first clock signal appropriate for the operation of the ghost microprocessor and peripheral devices normally linked to the microprocessor to be substituted under the control thereof. The accelerator board will include an upgrade microprocessor, and will normally include at least cache memory or RAM memory and/or other peripheral devices on a local bus which is linked to the upgrade microprocessor for operation at a higher clock speed than that of the peripheral devices linked to the ghost microprocessor. The accelerator board includes a second clock independent of the first clock for generating a second clock signal. The second clock is in the form of a stop-start oscillator. When it is requested that the upgrade processor emulate the ghost microprocessor, as will generally occur when data is to be transferred between the personal computer system and the accelerator board, a clock selector and oscillator switch act to stop the oscillator with the second clock signal in known, predetermined phase, and also to select the first clock. When the request is negated, the oscillator is started with the second clock signal in desired phase relationship with that of the first clock, and the second clock is selected to control the upgrade microprocessor.

In some instances, the upgrade microprocessor may have a different control set for communicating with peripheral devices, and it may also have a different internal clocking phase to that of the ghost microprocessor, and accordingly, the accelerator board may include an appropriate conversion means to permit it to emulate the ghost microprocessor for all operations intended to be under the control thereof.

These foregoing objects and aspects of the invention, together with other objects, aspects and advantages thereof will be more apparent from the following description of a preferred embodiment thereof, taken in conjunction with the following drawings.

BRIEF DESCRIPTION OF THE DRAWINGS

FIGS. 2a, 3a, 4a, 5a, 6a, 7a, 8a and 9a show in schematic form the various function blocks respectively labelled 2–9 in the accelerator board of FIG. 1;

FIGS. 2b, 5b, 6b, 7b and 8b show state transition diagrams for certain of the above function blocks.

DESCRIPTION OF THE PREFERRED EMBODIMENT

Figure 1:
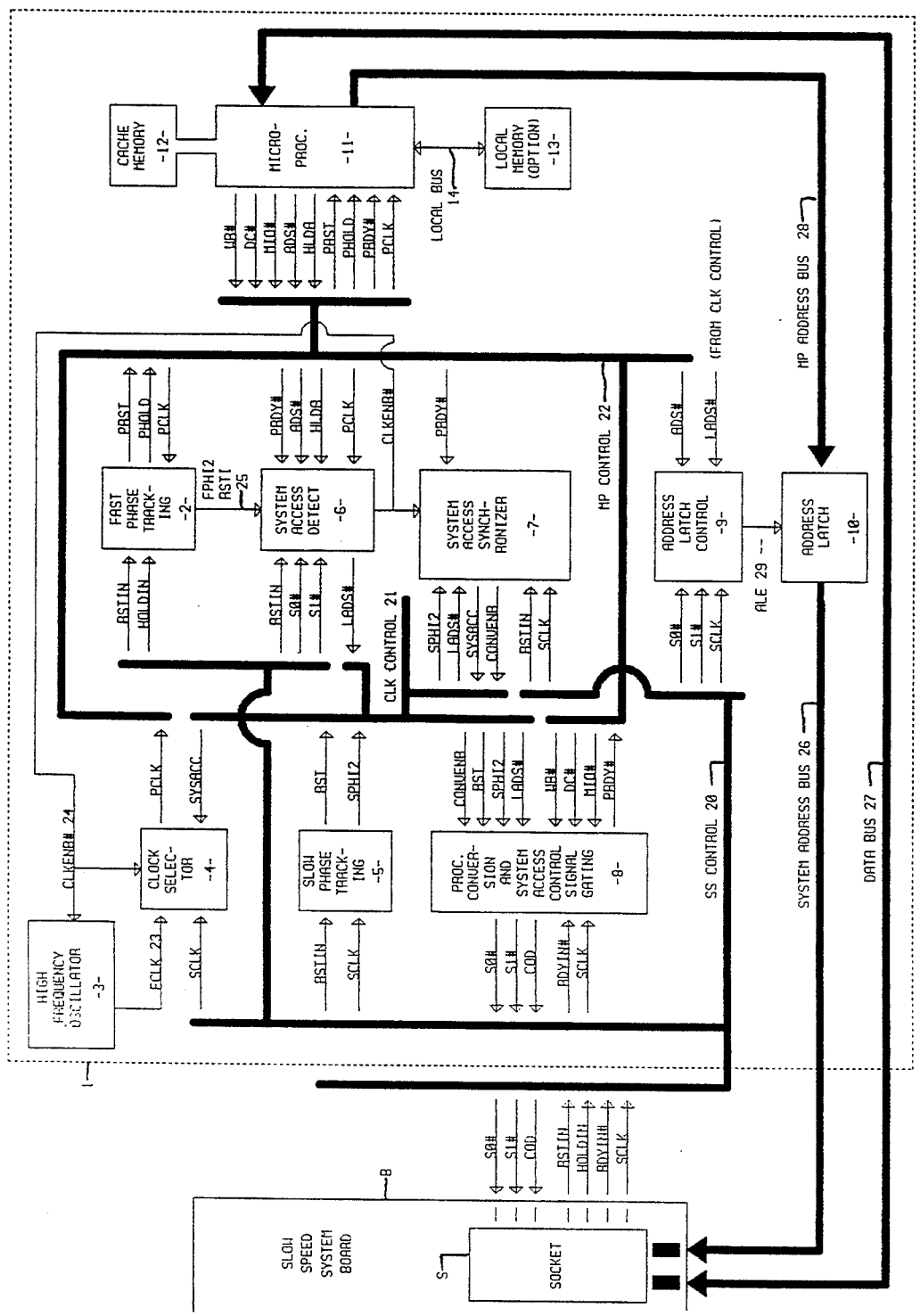
FIG. 1 shows in schematic form an accelerator board in accordance with the invention enclosed within a dashed outline, together with a portion of a slow speed system board with which the accelerator board is employed.

Referring to the drawings in detail, an accelerator board in accordance with the invention is identified generally by the numeral 1. Accelerator board 1 comprises a plurality of function blocks identified as follows:

2. FAST PHASE TRACKING
3. HIGH FREQUENCY OSCILLATOR
4. CLOCK SELECTOR
5. SLOW PHASE TRACKING
6. SYSTEM ACCESS DETECTOR
7. SYSTEM ACCESS SYNCHRONIZER
8. SYSTEM ACCESS CONTROL SIGNAL GATING AND PROCESSOR CONVERSION
9. ADDRESS LATCH CONTROL
10. ADDRESS LATCH

Accelerator board 1 further comprises a microprocessor 11 which will typically although optionally include an associated cache memory block 12, and which may optionally have an associated local memory block 13 connected thereto via a local bus 14. It will be understood that other peripheral devices may equally be connected to local bus 14.

Three major bus lines each made up of multiple conducting paths interconnect function blocks 2–10 as will be more particularly described. These major bus lines and the control signal paths and signals carried thereon are identified as follows:

| Signal Name | Signal Description |
|---|---|
| 20 SLOW SYSTEM CONTROL BUS (SS BUS) | |
| S0# | System Status 0 inverted |
| S1# | System Status 1 inverted |
| COD | System Code/Interrupt Ack. |
| RSTIN | System Reset |
| SCLK | System Clock |
| RDYIN# | System Ready inverted |
| HOLDIN | System Hold Request |
| 21 CLOCK CONTROL BUS (CLK BUS) | |
| RST | Internal Reset |
| SPHI2 | Slow Phase ÷ 2 |
| CONVENB | Conversion Enable |
| SYSACC | System Access |
| LADS# | Latched Address Select inv. |
| 22 MICROPROCESSOR CONTROL BUS (NO BUS) | |
| PCLK | Processor Clock |
| PRST | Processor Reset |
| PHOLD | Processor Bus Hold Request |
| HLDA | Processor Bus Hold Acknowledge |
| ADS# | Address Select inverted |
| MIO# | Memory, I/O inverted |
| DC# | Data, Control inverted |
| WR# | Write, Read inverted |

| Signal Name | Signal Description |
|---|---|
| PRDY# | Processor Ready inverted |

Minor bus lines are also provided on accelerator board 1, mid these, the signal paths and signals carried thereon are identified as follows:

| BUS | SIGNAL NAME | SIGNAL DESCRIPTION |
|---|---|---|
| 23 | FCLK | Fast Clock |
| 24 | CLKENB# | Clock Enable inverted |
| 25 | FPHI2 | Fast Phase ÷ 2 |
| | RSTI | Sync System Reset |
| 29 | ALE | Address Latch Enable |
| — | RDE# | Ready Enable inverted |

In accordance with convention, the symbol "#" is used to indicate that the signal is asserted in a low condition in the logic circuitry employed. It will be appreciated that with other circuitry the signal could equally be asserted in a high condition.

Accelerator board 1 is used in conjunction with a slow speed system board B which will normally include a socket S for a microprocessor for which board B was designed, which microprocessor will be responsive to those signals on SS bus 20 indicated above. In this case it will be recognized that these signals form part of the instruction set for an 80286 microprocessor. This "slow" microprocessor is removed from slow system board B and may be consequently referred to hereinafter as a ghost microprocessor. Accelerator board 1 includes pin connectors (not shown) which are receivable in socket S to interconnect SS bus 20 to socket S; such pin connectors will also connect system address bus 26 and data bus 27 to socket S to provide for the transfer of data between the slow system board and microprocessor 11. The control signals on MP bus 22 will be recognized as part of the instruction set of an 80386SX microprocessor. Given that this has a different address and control timing than that of the ghost microprocessor, system address bus 26 is connected to microprocessor 11 through address latch 10 and a microprocessor address bus 28 as will be further described. A processor control signal conversion unit as will be subsequently described, is used to convert certain of the control signals to permit the emulation of the ghost microprocessor by microprocessor 11.

GENERAL OVERVIEW OF CIRCUIT OPERATION

Slow speed system board B will normally include a continuously operational crystal clock that generates the clock signal SCLK intended to clock the ghost microprocessor originally present on the system board B, and data transfer between the system board and accelerator board 1.

High frequency oscillator 3 produces a clock signal that will be understood to have an appreciably higher frequency than that of SCLK. When data transfer is requested between the slow speed system board B and the accelerator board 1, clock selector 4 selects SCLK, and with minor modification as will be further described which is necessitated due to differences between the ghost 80286 microprocessor and the 80386SX microprocessor 11 of the accelerator board, uses SCLK to control the rate of operation of the accelerator board microprocessor. For other operations, clock selector 4 selects the fast clock signal FCLK generated by high frequency oscillator 3.

The various functional blocks that were introduced briefly above, the control signals and their manner of operation in controlling the high frequency oscillator 3 and the clock selector 4 so as to stop the oscillator with the FCLK signal in the known and predetermined phase and to start the oscillator with its clock signal in a desired phase relationship with that of the SCLK signal is more particularly described hereinafter.

The functional blocks may be incorporated into a plurality of programable array logic (PAL) devices, or integrated into one or more LSI chips. The logic equation or equations in accordance with which each functional block operates are also set out where appropriate.

FAST CLOCK PHASE TRACKING (FIG. 2a)

The logic equations in accordance with which functional block 2 operates are as follows:

|  | L1A: |  |  |  |  |  |  |
|---|---|---|---|---|---|---|---|
| /PRST |  | = | /RSTI | * | /PRST | + /RSTI | * /FPHI2 |
|  | L1B: |  |  |  |  |  |  |
| /FPHI2 |  | = | FPHI2 | * | /RSTI | + FPHI2 | * PRST |
|  | L1C: |  |  |  |  |  |  |
| /PHOLD |  | = | /FPHI2 | * | /HOLDI | + FPHI2 | * /PHOLD |

The state transition diagrams for this block are depicted in FIG. 2b.

Considering as a whole a slow speed system board B and accelerator board 1 combined therewith, at start up a reset signal RSTIN is generated by board B and received on SS bus 30. RSTIN is synchronized according to state transition diagram 2b to form the signal PRST which serves to reset microprocessor 11 and FPHI2 to track the internal phase of the microprocessor. RSTIN is partially synchronized to PCLK by a flip-flop 50 of FIG. 2a to form RSTI, which is carried on bus 25 to system access detector 6 as will be later described.

In accordance with convention, state transition diagrams used throughout represent a current state of the logic variable by the logic value within a circle. The directed line segments that emanate from the circles with the corresponding logic conditions, enter circles showing the logic values of the next state. With specific reference to FIGS. 2a and 2b, a transition is made from the current state to the next state on the next positive edge of PCLK, following the assertion of the logic conditions on any directed line segment. Starting with state (0,0) representing PRST=0 and FPHI2=0, and following the lines with condition RSTI=0 from (0,0) to (0,1) and back to (0,0) shows that PRST remains at logic 0 and FPHI2 toggles between logic 0 and logic 1 on each positive edge of PCLK for as long as the signal RSTI remains at logic 0. When RSTI goes to logic 1, the next state becomes (1,1) from either previous state (0,0) or (0,1) and then toggles between states (1,0) and (1,1) for as long as RSTI=1. This means that PRST and FPHI2 both go to logic 1 on the next positive edge of PCLK following RSTI going to logic 1 and subsequent positive edges of PCLK, FPHI2 toggles between logic 0 and logic 1 while PRST remains at logic 1. This completes the synchronization of PRST with PCLK and sets the phasing of FPHI2. Finally when RSTI goes to logic 0, the circuit waits until state (1,0) and then goes to state (0,1) and toggles between states (0,0) and (0,1). Thus FPHI2 toggles with the original phasing derived from RSTI going to logic 1 but PRST remains asserted at logic 1, until RSTI negates to logic 0 and FPHI2 is at logic 0 before PRST negates to logic 0.

Also in FIG. 2a is a circuit to synchronize HOLDIN, generated on slow system board B, that produces the signal PHOLD for microprocessor 11, using two flip-flop 52,54 operating in accordance with logic equation L1C above. The HOLDIN signal is partially synchronized to PCLK by a first flip-flop 52 generating HOLDI, which is further synchronized by second flip-flop 54 to form PHOLD. The corresponding state transition diagram also shown in FIG. 2b, shows that PHOLD follows the state of HOLDI but in phase with FPHI2 such that all state changes of PHOLD are on the positive edge of PCLK following the condition that FPHI2=0. This sets the proper timing conditions on PHOLD for use by microprocessor 11.

HIGH FREQUENCY OSCILLATOR (FIG. 3a)

The high frequency oscillator 3, comprises a pair of Nor gates 56,58 coupled with a delay line feedback loop 60. The circuit will start to oscillate when CLKENB# applied on bus 24 asserts to logic 0, thus enabling the Nor gate 56 in the delay line feedback loop 60. The period of the oscillator is twice the sum of the delay times of the Nor gate and the delay line. The second Nor gate 58 buffers the delay line output to form FCLK. When CLKENB# negates (goes to logic 1), the oscillator stops, with FCLK always at logic 0.

CLOCK SELECTOR (FIG. 4a)

The clock selector circuit uses the following logic equation:

|  | L2: |
|---|---|
| /PCLK = | /SYSACC * FCLK * /CLKENB# + SYSACC * SCLK |

When SYSACC is low, to indicate that access to board B is not required, on the receipt by the clock selector of CLKENB# low signal, FCLK is inverted to become PCLK, which is routed on MP bus 22 to clock the operation of microprocessor 11. When CLKENB# goes high (logic 1), the high frequency oscillator 3 stops with FCLK at logic 0 as earlier described. The high logic signal of CLKENB# also forces PCLK to logic 1 in accordance with equation L2; this has the same effect as that noted above which results from FCLK changing logic 0, but is implemented in this circuit with less delay. The reduced delay is desirable, since PCLK should not be allowed to go to logic 0, which would normally occur in the next half period of the high frequency oscillator. Later SYSACC asserts to logic 1 causing the clock selector 4 to select the inverted SCLK, when SCLK is at logic 0. Since PCLK was previously logic 1, it will be seen that the circuit switches between the high frequency oscillator and the slow system clock in phase to clock the microprocessor 11 at the appropriate speed depending upon the access cycle being performed.

SLOW PHASE TRACKING (FIG. 5a)

The Slow phase tracking block 5 operates in accordance with the following logic equations

| | L3A: | | | | | |
|---|---|---|---|---|---|---|
| /RST | = | /RSTIN | * | /RST | + /RSTIN | * /SPHI2 |
| | L3B: | | | | | |
| /SPHI2 | = | SPHI2 | * | RST | + /RSTIN | * SPHI2 |

The corresponding state transition diagram is shown as FIG. 5b. The slow phase tracking circuit 5 output control signal RST, an internal reset signal, and SPHI2 which serves to track the internal phases corresponding to the ghost 80286 microprocessor. The state transition diagram of FIG. 5b is similar to that for the PRST and FPHI2 outputs shown in FIG. 2b except that the state transitions here occur on the negative edge of SCLK; accordingly that system reset RSTIN can be used directly to toggle the outputs RST and SPHI2, without necessitating the generation of intermediate signal RSTI.

SYSTEM ACCESS DETECTOR (FIG. 6a)

The system access detector 6 operates in accordance with the following equations:

| | L5A: | | | | | | | | |
|---|---|---|---|---|---|---|---|---|---|
| CLKENB# | = | FPHI2 | * | /ADS# | * | /RSTI | * | /RSTIN | |
| | + | PRDY# | * | CLKENB# | * | /RSTI | * | /RSTIN | |
| | + | /FPHI2 | * | CLKENB# | * | /RSTI | * | /RSTIN | |
| | L5B: | | | | | | | | |
| /LADS# | = | /ADS# | * | S0# | * | S1# | * | /HLDA | |
| | + | S0# | * | /LADS# | * | S1# | * | /RSTIN | |

The system access detector generates the signal which serves CLKENB#, which serves to control the high frequency oscillator 3 as earlier described, and the signal LADS# which serves to maintain the address select state of the microprocessor 11 for the system access control signal gating and processor conversion circuits. As shown in the state transition diagram CLKENB# of FIG. 6b, the signal RSTI=1 forces CLKENB# to logic 0 and LADS# to logic 1. The state of CLKENB# remains at logic 0 until the positive edge of PCLK following the logic condition (ADS#=0) and (FPHI2=1), indicating the assertion of address select and the proper sampling phase respectively, become true and CLKENB# goes to logic 1. This stops the high frequency oscillator 3 and starts the process of synchronization of the phases for a system access. The state transition diagram of FIG. 6b for LADS# shows that the asserted ADS# (logic 0) causes LADS# to assert to logic 0 providing that (HLDA=0) indicating no bus hold acknowledge, and both (S0#=1) and (S1=1) indicating no system status is presently gated to the system are true. The LADS# signal remains at logic 0 until the system status is gated by the processor conversion circuit to the system, (S0#=0) or (S1=0), then LADS# negates to logic 1. Returning to the state transition diagram 6b for CLKENB#, it will be seen that CLKENB# remains at logic 1 until the positive edge of PCLK following the logic condition (PRDY#=0) and (FPHI2=1) and (ADS#=1), indicating a system access ready is gated to and sampled by the microprocessor 11 and that no further system access is pending, is true. Correspondingly CLKENB# goes to logic 0, thereby re-starting the high frequency oscillator 3.

SYSTEM ACCESS SYNCHRONIZER (FIG. 7a)

The system access synchronizer 7 operates in accordance with logic equation L4 as follows:

| | L4: | | | | | | |
|---|---|---|---|---|---|---|---|
| /SYSACC | = | /SPHI2 | * | /SYSACC | | | |
| | + | SPHI2 | * | /CONVENB | * | /SYSACC | |
| | + | SPHI2 | * | /CONVENB | * | /PRDY# | * LADS# |
| | + | SPHI2 | * | SYSACC | * | /PRDY# | * LADS# |
| | + | RSTIN | * | /CONVENB | | | |

The system access synchronizer uses a flip-flop 62 to convert CLKENB#6 to the signal CONVENB, which enables the processor conversion block 8. The system access synchronizer 7 also generates the signal SYSACC, which serves to toggle clock selector block 4 as earlier described and to indicate an access to the system. CLKENB# is partially synchronized to SCLK to form CONVENB, which in accordance with equation L4 generates SYSACC and completes the synchronization to SCLK. As indicated in the SYSACC state transition diagram of FIG. 7b, RSTIN=1 forces SYSACC to logic 0, and SYSACC will remain at logic 0 until the logic condition (CONVENB=1) and (SPHI2=1) is true, which indicates that the clock switch and the synchronization to the system phase is complete. On the negative edge of SCLK following the assertion of the condition, SYSACC asserts to logic 1 and remains at logic 1 indicating that the data transfers are to the system, until the logic condition (SPHI2=1) and (PRDY#=0) and LADS#=1), which indicates that the microprocessor ready signal PRDY# is being sampled on this clock cycle, and that no more consecutive system accesses are pending (LADS#=1). On the negative edge of SCLK following the assertion of this condition, SYSACC goes to logic 0 and back to the Fast access state.

knowledge access (0,0,1). The following table summarizes the conditions for each transition:

| WR# | DC# | MIO# | ACCESS TYPE | S0# | S1# |
|---|---|---|---|---|---|
| 0 | 1 | 1 | MEMORY DATA READ | 1 | 0 |
| 0 | 1 | 0 | I/O DATA READ | 1 | 0 |
| 0 | 0 | 1 | MEMORY CODE READ | 1 | 0 |
| 1 | 1 | 1 | MEMORY DATA WRITE | 0 | 1 |
| 1 | 1 | 0 | I/O DATA WRITE | 0 | 1 |
| 0 | 0 | 0 | INTERRUPT ACKNOWLEDGE | 0 | 0 |
| 1 | 0 | 1 | HALT, SHUTDOMN | 0 | 0 |

SYSTEM ACCESS CONTROL SIGNAL GATING AND PROCESSOR CONVERSION (FIG. 8a)

The system access control signal gating portion of block 8 functions in accordance with logic equation L6A:

```
      L6A
RDE# = /SPHI2   * RDE#
     + /RDYIN#  * SPHI2  * S1#   * S0#
     + S1#      * S0#    * RDE#
     + RST
```

This portion of block 8 serves to generate the system ready gating signal RDE# and the related and previously described control signal PRDY# for the microprocessor 11.

The processor conversion circuit portion of block 8 serves to generate the system status signals S0# and S1# and the Code/Interrupt acknowledge signal COD. This portion of block 8 functions in accordance with logic equations L6C, L6D and L6B as follows:

```
        L6C:
/S0#  = SPHI2 * /LADS# * RDE# * WR# * /RST * CONVENB
      + /RDYIN# * SPHI2 * /LADS# * WR# * /RST * CONVENB
      + SPHI2 * /LADS# * /DC# * RDE# * /MIO# * /RST * CONVENB
      + /RDYIN# * SPHI2 * /LADS# * /DC# * /MIO# * /RST * CONVENB
      + /SHII2 * /S0#
        L6D:
/S1#  = SPHI2 * /LADS# * RDE# /WR# * /RST * CONVENB
      + SPHI2 * /LADS# * /DC# RDE# * /RST * CONVENB
      + /RDYIN# * SPHI2 * /LADS# * /WR# * /RST * CONVENB
      + /RDYIN# * SPHI2 * /LADS# * /DC# * /RST * CONVENB
      + /SPHI2 * /S1#
        L6B:
/COD  = DC# * MIO# + /DC# * /MIO# + WR# * MIO#
```

The state transition diagram for the signals S0#, S1# and RDE# is shown in FIG. 8b. The signal COD does not need a transition diagram as it is a combinational function only of the microprocessor control signals DC#, WR#, and MIO#. The signal RST from the slow phase tracking block 5, when at logic 1 negates all three signals S0#, S1# and RDE# to logic 1, which is the Idle state (1,1,1). The signals remain in this state until a system access is detected causing (LADS#=0) and (CONVENB=1) and until (SPHI2=1) indicating the proper phasing for the system status is asserted. On the negative edge of SCLK following the assertion of this condition and depending upon the microprocessor access command formed by the signals WR#, DC# and MIO#, the signals S0#, S1# and RDE# will change to one of the following three states—Write access (0,1,1), Read access (1,0,1) or Halt, Shutdown, Interrupt Ac- On the second negative edge of SCLK following this state transition, SPHI2 will be logic 1, and the state will change to Gate Ready (1,1,0) where RDE# is logic 0 and gates the system ready RDYIN# through the Or gate to the microprocessor as PRDY#. The signals remain in state (1,1,0) until the negative edge of SCLK that corresponds to the positive edge of PCLK when the microprocessor samples and finds PRDY# asserted. The logic condition for this is (RDE#=0) and (SPHI2 =1) and (RDYIN#=0). Here the state transition can go back to the Idle state (1,1,1) if (LADS#=1) for no pending system accesses, or to the Write state (0,1,1). Read state (1,0,1) or Halt/Intr state (0.0,1) if (LADS#=0) indicating a pending system access request by the microprocessor. The bypassing of the Idle state when the next consecutive system access is pending, eliminates any additional wait states caused by the processor conversion circuit.

ADDRESS LATCH CONTROL (FIG. 9a)

The address latch control block 9 operates in accordance with logic equation L7 as follows:

```
       L7
/ALE + LADS#  * ADS#+ /S0#  * /S1#
```

Address latch control block 9 serves to generate an address latch enable signal ALE which is connected on bus 29 to address latch 10. On the first negative edge of SCLK following (ADS#=0) or (LADS#=0) ALE goes to logic 1 to open the latch. Conversely, address latch 10 is closed when ALE goes to logic 0 on the first negative edge of SCLK following the system status being asserted (S0#=0) or (S1#=0). Thus the address latch 10 which locates between the MP Address bus 28 and the System Address bus 26 opens at least one cycle of clock SCLK prior to the system status being asserted and remains closed for at least one cycle of SCLK past the system status being negated. This satisfies the timing requirements for the address to the system. It will be appreciated that the address latch 10 is only required because the ghost 80286 microprocessor of system board B been replaced by a 80386SX type microprocessor 11 which has different address and control timing than the ghost microprocessor.

OPERATION OF COMBINED SYSTEM

Initially after the power-on reset, (T=0, FIG. 10), the signals CLKENB# and SYSACC are both at logic 0, thus enabling the high frequency oscillator 3 and selecting the high frequency oscillator output FCLK inverted at the clock selector circuit 4 to form the microprocessor clock PCLK. Accordingly, microprocessor 11 will be operating at its fast clock speed.

The Fast phase tracking circuit 2 generates a signal FPHI2 which is initialized by the microprocessor reset signal PRST, so that FPHI2 is in phase with the internal timing state of the 80386SX microprocessor. Since initially the microprocessor 11 uses the high frequency clock, the microprocessor reset signal PRST is foraged by synchronizing the system reset signal RSTIN with the high frequency clock PCLK in the tracking block 2. In addition, the Slow phase tracking block 5 generates the SPHI2 signal which is initialized by the system reset signal RSTIN, so that the SPHI2 signal is in phase with the internal timing state of the ghost 80286 microprocessor.

When an access to the Slow system B is detected by microprocessor 11, which will occur when ADS# is asserted (FIG. 10 at T1), the system access detector 6 negates CLKENB# (goes to logic 1) thereby stopping the high frequency oscillator 3 in a specific phase and logic state. Microprocessor 11 is considered to have an on chip cache memory 12 so that assertion of the Address Select signal ADS# indicates an access to the slow system B peripherals is requested. The system access detector circuit 6 then negates CLKENB# (goes to logic 1) on the next positive going edge of PCLK following the condition of (ADS#=0) and (FPHI2=1) as indicated in the state transition diagram of FIG. 6b and shown in the timing diagram of FIG. 10 at T2. The system access synchronizer 7, synchronizes the transition of CLKENB# to logic 1, to the negative edge of the system clock SCLK to form signal CONVENB and then following the condition of (CONVENB=1) and (SPHI2=1), assets SYSACC. The asserting of SYSACC (going to logic 1), switches the source of the microprocessor clock PCLK through the clock selector 4 from PCLK to SCLK inverted. At the same time system access control signal gating and processor conversion circuits of block 8 assert control signals S0# and S1# synchronous with the negative edge of SCLK to the system to start the system access at T3. Because CLKENB# has stopped the high frequency oscillator at T2 such that PCLK is at logic 1 and as SPHI2 is going to logic 0, SYSACC selects SCLK inverted in the clock selector circuit 4 so that PCLK is at logic 1 and in phase with SPHI2 going to logic 0. Accordingly, subsequent cycles of SPHI2 and FPHI2 will be identical and in phase, as shown at times T4 through T7. In this way PCLK is switched from the high frequency oscillator to the slow system clock SCLK while maintaining the proper phasing between the microprocessor 11 and that of the ghost microprocessor in a seamless manner.

Figure 10:
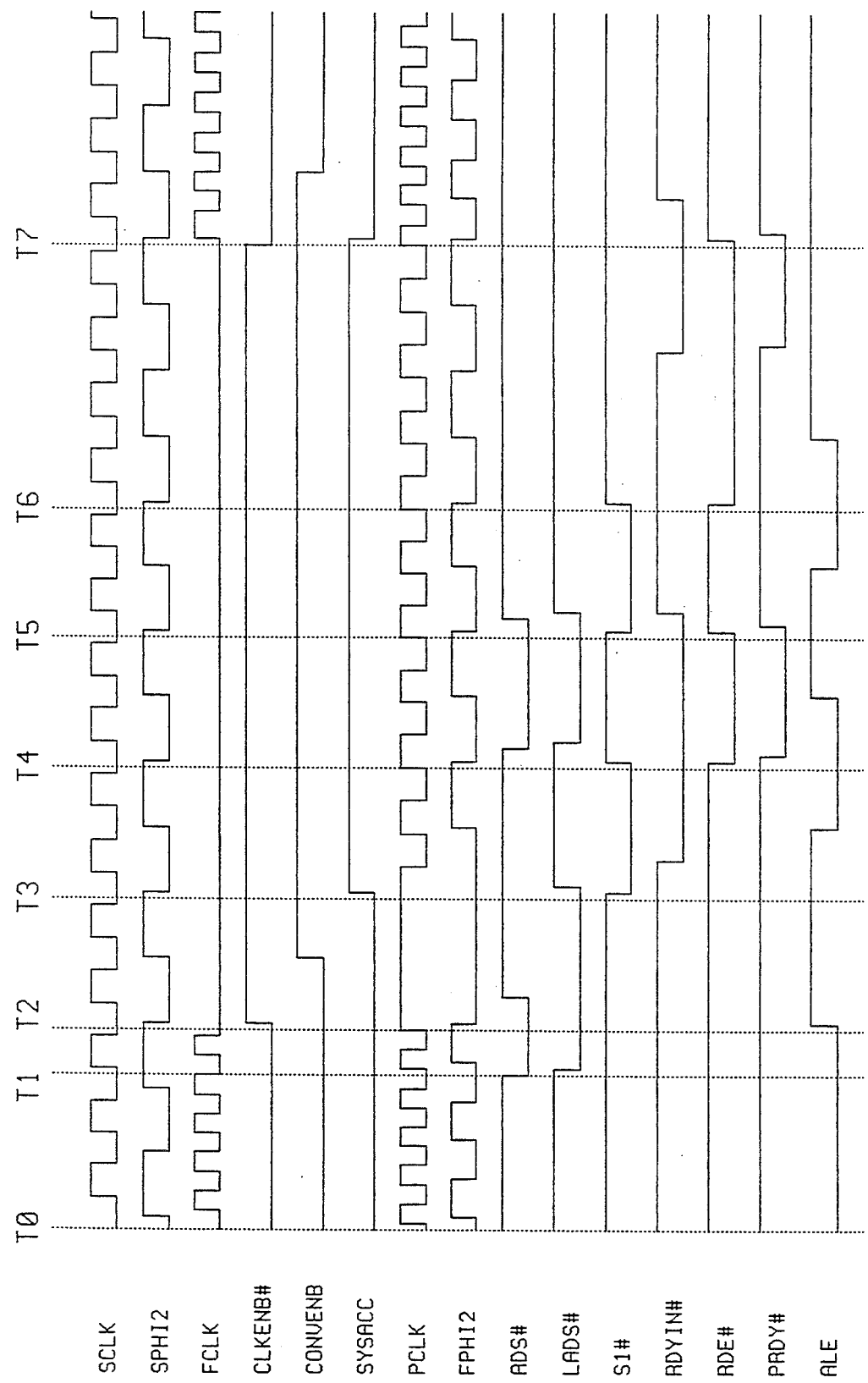
FIG. 10 shows a timing diagram for certain of the control signals used in the accelerator board of the invention.

Following the switch over commencing at T1 microprocessor 11 operates at the SCLK speed, using this SCLK signal, which is inverted because the 80386 type microprocessor uses the opposite edge of the clock to that used by the ghost 80286 microprocessor. However, the internal phasing of microprocessor 11 is maintained (FPHI2 matches SPHI2), and the data transfers on Data bus 27 between the slow system and the microprocessor 11 are properly timed. Only the gating of system ready RDYIN# in the access control signal gating circuit 8 is required to ensure that the microprocessor 11 maintains the Write data or samples the Read data at the proper time. The system access detector circuit 6 also produces the signal LADS# at the time the system access is detected, and uses this signal to enable the circuit to gate the control signals to the system. The LADS# signal is asserted (goes to logic 0) by ADS# going to logic 0 and is negated (goes to logic 1) by control signals S0# or S1# going to logic 0—sec state diagram FIG. 6b. In the 80386 to 80286 control signal conversion circuit 8a, as shown in state transition diagram FIG. 8b, the 80386SX control signals LADS#, WR#, DC# and MIO# are converted to 80286 control signals S0#, S1# and ready gating signal RDE#. The timing diagram of FIG. 10 shows that the control signal S1# to the system asserts to logic 0 on the negative edge of SCLK at time T3 and negates to logic 1 two periods of SCLK later at time T4, at which RDE# asserts to logic 0 to gate the ready signal RDYIN# from the system to the microprocessor 11 as signal PRDY#, which is sampled two cycles of PCLK later at time T5. The finding of PRDY# asserted (logic 0) by the microprocessor 11 at time T5 ends this system access cycle.

Since an 80386SX type microprocessor is executing in pipeline mode, a pending next system access cycle is indicated by ADS# being asserted (logic 0) prior to time T5, causing the system access detector 6 to maintain CLKENB# at logic 1, and the system access synchronizer 7 to maintain SYSACC at logic 1 so that the next system access proceeds without necessitating further synchronizing or incurring any conversion delay. On the same falling edge of SCLK at time T5, the control signal S1# is gated to the system for the next access and signal RDE# is negated, so that PRDY# signal to microprocessor 11 is inhibited. For the next access to the system, the timing is identical to that of the original microprocessor using SCLK. Two periods of SCLK after the control signals are gated to the system, they are negated and RDE# is asserted to logic 0 at time T6 to allow system ready RDYIN# to form signal PRDY# at Or gate 64 (FIG. 8a) and ready to the microprocessor. In this second access, the system ready signal RDYIN# is delayed by the system to add a wait state, thus PRDY# is not found asserted (logic 0) at the microprocessor until time T7.

Because no more slow speed system accesses are pending, ADS# is not asserted (logic 1) prior to time line T7, this causes SYSACC to be negated (go to logic 0) by the system access synchronizer 7 which switches the clock selector 4 back to the high frequency clock—(see state diagram FIG. 7b). Also at time T7, the system access detector circuit 6 asserts CLKENB# (goes to logic 0) thus enabling the high frequency oscillator 3—(see state diagram FIG. 6b). This occurs on the positive edge of PCLK when SPHI2 are both at logic 1, thereby switching from the low speed system clock to the high frequency clock without delay. This allows the microprocessor to execute using the high frequency clock for as much time as is possible.

When local memory 13 is used on accelerator board 1, provision is made to allow a signal MEMACC# when asserted (logic 0) to inhibit an asserted ADS# signal from asserting LADS# (going to logic 0) and also negating CLKENB# (going to logic 1), thereby permitting transfers on local bus 14 at the FCLK speed. The MEMACC# signal is used by system access detector block 6 in accordance with modified logic equations L5A and L5B as follows:

---
L5A (modified)
CLKENB# = FPHI2 * /ADS# * /RSTI * /RSTIN * MEMACC#
+ PRDY# * CLKENB# * /RSTI * /RSTIN
+ /FPHI2 * CLKENB# * /RSTI * /RSTIN
L5B (modified)
/LADS# = /ADS# * S0# * S1# * /HLDA * MEMACC#
+ S0# * /LADS# * S1# * /RSTIN * MIEMACC#
---

It will be apparent that many changes may be made to the illustrative embodiment while falling within the scope of the invention, and it is intended that all such changes be covered by the claims appended hereto.

We claim:

1. An accelerator board for use in replacing the microprocessor of a computer system board, said computer system board including a continuously operating clock generating a first clock signal at a first frequency for controlling the input and output of digital information to and from said computer system board; said accelerator board comprising:
  an upgrade microprocessor capable of operating at a higher frequency of operation than said clock frequency;
  a high frequency stop start oscillator independent of said clock for generating a second clock signal at a second frequency higher than that of said first frequency;
  means for starting said oscillator with said second clock signal in desired phase relationship with said first clock signal; and
  means for selecting one of said first clock signal and said second clock signal to provide a clock signal for the operation of said upgrade microprocessor.

2. An accelerator board as defined in claim 1, wherein said means for starting said high frequency oscillator is responsive to a request to transmit data between said accelerator board and said computer system board to stop said oscillator with said second clock signal in a predetermined phase.

3. An accelerator board as defined in claim 2, wherein said means for starting said oscillator and said clock selecting means act to change said clock signal for the operation of said upgrade microprocessor from said first clock signal to said second clock signal without introduction of a wait state responsive to the negation of said request.

4. An accelerator board as defined in claim 1, wherein said high frequency oscillator comprises a pair of Nor gates coupled with a delay line.

5. An accelerator board as defined in claim 1, wherein said replaced microprocessor and said upgrade microprocessor have different control signals and wherein signal conversion means is provided on said accelerator board to permit said upgrade microprocessor to emulate said replaced microprocessor.

6. An accelerator board as defined in claim 1, wherein said accelerator board includes at least one of cache memory and local memory.

7. Method of enhancing the performance of a computer system including a microprocessor and a clock generating a first clock signal at a first frequency to clock the operation of said microprocessor wherein said system microprocessor is removed and replaced by an accelerator board with an enhanced microprocessor and a high frequency oscillator generating a second clock signal at a second frequency comprising:
  stopping said high frequency oscillator responsive to a request to transmit data between said system and said accelerator board and selecting said first clock signal to clock the operation of said enhanced microprocessor, and starting said high frequency oscillator with said second clock signal in desired phase relationship with said first clock signal on negation of said request and selecting said second clock signal to clock the operation of said enhanced microprocessor.

8. Method as defined in claim 7, wherein said high frequency oscillator is stopped with said second clock signal in a predetermined phase.

9. Method as defined in claim 7, wherein said system microprocessor and said enhanced microprocessor have different control instructions and wherein control instructions are convened to permit said enhanced microprocessors to emulate the removed microprocessor.

10. Method as defined in claim 7, wherein said removed microprocessor and said enhanced microprocessor are clocked at different edges of said clock signal and wherein said first clock signal is inverted when selected.

11. A computer system including a first group of components for operation at a first digital transfer rate, a clock generating a first clock signal at a first speed related to said first transfer rate;
  a second group of components including at least a microprocessor operable at a second digital transfer rate higher than said first rate;
  a high frequency oscillator independent of said clock for generating second clock signals at a second speed related to said second transfer rate;
  a clock selector togglable between two states respectively for connecting a clock signal selected from said first clock signal and said second clock signal to said microprocessor for controlling the speed of operation thereof; and
  means responsive to a signal from said microprocessor for starting said high frequency oscillator with said second clock signal in desired phase relationship with said first clock signal and for toggling said clock selector between said states in accordance with the group of components to be addressed, when said clock signals are in said desired phase relationship.

12. A computer system as defined in claim 11, wherein said means responsive to said signal from said microprocessor acts is responsive to the negation of said signal to stop said high frequency oscillator with said second clock signal in a predetermined phase.

13. A computer system as defined in claim 11, wherein said clock is continuously operated.

14. A computer system as defined in claim 11, wherein said high frequency oscillator comprises a pair of Nor gates coupled by a time delay line.

* * * * *